United States Patent
Letas

(10) Patent No.: US 8,934,270 B2
(45) Date of Patent: Jan. 13, 2015

(54) CONTROL CIRCUIT AND METHOD FOR CONVERTERS OF WIND TURBINES

(75) Inventor: Heinz-Hermann Letas, Bovenau (DE)

(73) Assignee: Senvion SE, Hamburg (DE)

( * ) Notice: Subject to any disclaimer, the term of this patent is extended or adjusted under 35 U.S.C. 154(b) by 123 days.

(21) Appl. No.: 13/824,255

(22) PCT Filed: Dec. 14, 2011

(86) PCT No.: PCT/EP2011/072832
§ 371 (c)(1),
(2), (4) Date: Mar. 15, 2013

(87) PCT Pub. No.: WO2012/095233
PCT Pub. Date: Jul. 19, 2012

(65) Prior Publication Data
US 2013/0170254 A1    Jul. 4, 2013

(30) Foreign Application Priority Data
Jan. 14, 2011   (DE) .......................... 10 2011 008 615

(51) Int. Cl.
*H02M 5/458*   (2006.01)
*H02M 5/42*    (2006.01)
(Continued)

(52) U.S. Cl.
CPC ............... *H02M 5/42* (2013.01); *H02J 3/1892* (2013.01); *H02P 9/007* (2013.01); *Y02E 10/763* (2013.01)
USPC ................................ 363/37; 290/44; 323/207

(58) Field of Classification Search
USPC ..................... 363/34, 35, 37; 290/44; 323/207
See application file for complete search history.

(56) References Cited

U.S. PATENT DOCUMENTS

2005/0140142 A1* 6/2005 Welches et al. ................. 290/41
2009/0206606 A1* 8/2009 Jorgensen et al. .............. 290/44
2009/0267572 A1 10/2009 Engelhardt et al.
(Continued)

FOREIGN PATENT DOCUMENTS

DE    10 2006 027 465    12/2007
DE    10 2008 034 531    8/2009

OTHER PUBLICATIONS

International Preliminary Report on Patentability and Written Opinion dated Jul. 16, 2013, directed to International Application No. PCT/EP2011/072832; 12 pages.
(Continued)

*Primary Examiner* — Gary L Laxton
(74) *Attorney, Agent, or Firm* — Morrison & Foerster LLP

(57) ABSTRACT

Controlling a converter of a wind turbine is disclosed. The converter is connected to a rotor of a doubly fed asynchronous generator in order to feed electrical energy into an electric network. The converter comprises a network-side inverter, a generator-side inverter, and a controller, which outputs target values for demanded reactive power to at least one of the inverters. A reactive power target signal is determined for the portion that the network-side inverter contributes to the demanded reactive power $Q_T$, a slip signal is determined from the frequency of the network and the rotational speed of the generator, a gain value is calculated according to the slip signal, and the gain value is modified according to the reactive power target signal for the network-side inverter. The distribution of the reactive power between the two inverters is thus optimized over a wide operating range, not only at individual predetermined operating points.

17 Claims, 6 Drawing Sheets

(51) Int. Cl.
*H02J 3/18* (2006.01)
*H02P 9/00* (2006.01)

(56) References Cited

U.S. PATENT DOCUMENTS

2009/0278354 A1* 11/2009 Ichinose et al. ................. 290/44
2010/0133831 A1* 6/2010 Scholte-Wassink et al. ... 290/44
2010/0320762 A1 12/2010 Letas et al.
2011/0291414 A1* 12/2011 Arinaga et al. ................. 290/44

OTHER PUBLICATIONS

Xu, D. et al. "Reactive Power Analysis and Control of Doubly Fed Induction Generator Wind Farm," *13th European Conference on Power Electronics and Application* Sep. 8-10, 2009: Barcelona, Spain; pp. 1-10.

International Search Report mailed Feb. 13, 2013, directed to International Application No. PCT/EP2011/072832; 5 pages.

* cited by examiner

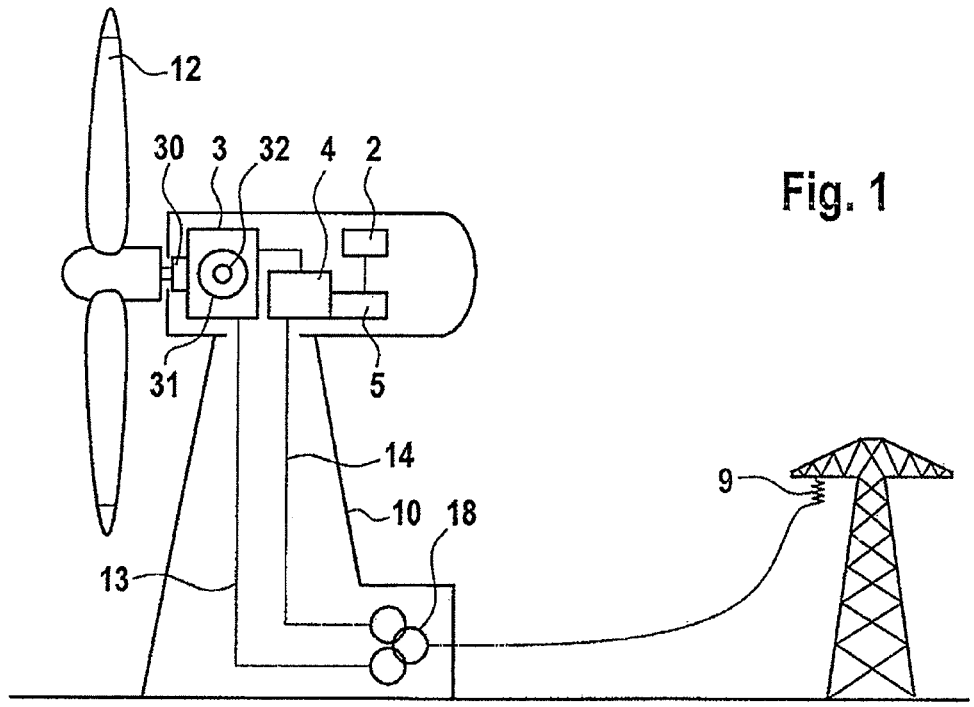
Fig. 1
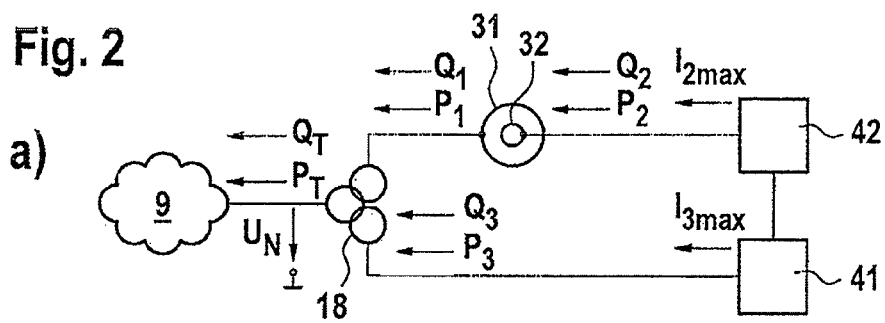
Fig. 2
a)
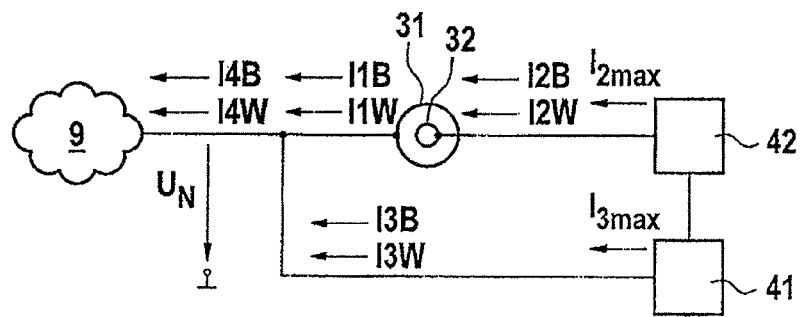
b)

CONTROL CIRCUIT AND METHOD FOR CONVERTERS OF WIND TURBINES

REFERENCE TO RELATED APPLICATIONS

This application is a national stage application under 35 USC 371 of International Application No. PCT/EP2011/072832, filed Dec. 14, 2011, which claims the priority of German Application No. 10 2011 008 615.3, filed Jan. 14, 2011, the entire contents of which are incorporated herein by reference.

FIELD OF THE INVENTION

The invention relates to a method for controlling a converter of a wind turbine which is connected to a rotor of a doubly fed asynchronous generator in order to feed electrical energy into an electrical network, wherein the converter comprises a generator-side inverter, a network-side inverter and a controller which outputs setpoints for demanded reactive power to at least one of the inverters. The invention further relates to a device having a correspondingly operated converter.

BACKGROUND OF THE INVENTION

Modern wind turbines are usually designed with variable rotational speed and have a converter. The generator can therefore turn with a rotational speed determined by the wind strength and in the process generate electrical energy with a correspondingly speed-dependent frequency. This variable-frequency electrical energy is converted by the converter so that it is suitable for feeding into a fixed-frequency supply network (usually 50 Hz). Converters of this kind usually have two inverters which are connected by a link circuit. In doing so, one of the inverters is connected to the network and, in operation, is supplied with the network frequency (network-side inverter), while the other inverter (machine-side inverter) is connected to the generator, wherein the frequency applied thereto is determined among other things by the rotational speed of the wind rotor. Converters of this kind can be designed as full converters or partial converters, the latter in particular in combination with a doubly fed asynchronous machine. However, with the increasing spread of wind turbines and the rise in installed reactive power, the demand is no longer for a simple feeding of active power into the electrical network alone; instead a mode of operation of the wind turbines which performs additional services for the network is desired. The so-called system services for the network in particular include the feeding of reactive power, for example for supporting the network at reduced voltage or network frequency. In so doing, particularly in the case of the doubly fed asynchronous generators which are often used with wind turbines with higher power, the problem can occur that the converter, which is usually rated for only one third of the total electrical power of the wind turbine, is no longer able to achieve the additional currents required to support the network. This applies particularly when unfavorable operating conditions, which in any case lead to increased currents, prevail due to undervoltage or low network frequency. Furthermore, additional complications can arise due to additional requirements such as, for example, the requirement for low-noise operation and, frequently associated therewith, operation in the region of synchronous speed.

For better utilization of the converter, it is known to determine the reactive power current for the network-side inverter linearly as a function of the total reactive power demand. Although this improves the utilization of the converter with regard to reactive power recovery, there is an associated risk of overload, above all in the critical operating situations close to the synchronous operating point. Furthermore, it has been proposed to dynamically vary the distribution of reactive power between the two inverters of the converter during operation. This must be carried out as a function of whether certain pre-defined conditions are fulfilled in order to relieve the reactive power on the inverter with the higher active power loading. It has been shown that the proposed concept gives rise to certain difficulties in balancing, and frequently only a mode of operation at the nominal point at rated speed, rated power and rated network frequency can be balanced.

SUMMARY OF THE INVENTION

The invention is based on the object of improving the provision of reactive power, in particular improving the utilization of the converter.

The solution according to the invention lies in the characteristics as broadly described herein. Advantageous improvements are the subject matter of the detailed embodiments described below.

With a method for controlling a converter of a wind turbine which is connected to a rotor of a doubly fed asynchronous generator in order to feed electrical energy into an electrical network, wherein the converter comprises a generator-side inverter, a network-side inverter and a controller which outputs setpoints for demanded reactive power to at least one of the inverters, the invention provides for a determination of a reactive power setpoint signal for the portion that one of the inverters contributes to the demanded reactive power, a determination of a slip signal from the frequency of the network and the rotational speed of the generator, a calculation of a gain value as a function of the slip signal, a modification of the reactive power setpoint signal for this inverter by means of the gain value, and an opposite changing of the reactive power setpoint signal for the other of the inverters.

An important part of the invention is the concept of subjecting a gain function which is dependent on the slip of the generator in order to determine the reactive power to be supplied by one of the inverters, preferably the network-side inverter. The slip-dependent gain function produces an increase or reduction respectively in the portion of the required reactive power provided by this inverter. The increase or reduction respectively modulates the portion that this inverter supplies to the demanded reactive power, namely as a function of the slip state of the wind turbine. For example, by virtue of the invention, with no or with only little slip (that is to say when operating at or close to the synchronous operating point, i.e. in the synchronous region) the portion provided by the network-side inverter can therefore be increased in order to relieve the load on the machine-side inverter, which is often operated at its load limit when operating in the synchronous range—conversely, at greater slip, the network-side inverter no longer needs to provide such a large portion but can contribute a smaller part of the reactive power.

The invention has recognized that, with this slip-dependent increase/decrease, the distribution of the reactive power between the two inverters can be optimized over a wide operating range and not only at individual, discrete predetermined operating points as is the case with the solutions known from the prior art. By taking into account the slip as an input parameter, the invention enables the distribution of the reactive power between the two inverters to be matched accordingly even when the network frequency deviates from the nominal frequency. While conventionally, when the network frequency increases, a problematic higher current loading of the rotor windings occurs due to the associated reduction in the slip, by virtue of the modified setpoint reduction according to the invention, an even greater contribution of the inverters can be achieved overall. The invention therefore provides a high degree of robustness with respect to deviations of the network frequency, namely over a wide operating range, even with the conventionally critical operation in the synchronous speed region. This improves the usability of the wind turbine, in particular the possibility of operating with low-noise and lower rotational speeds with simultaneously higher torque, which up to now have been associated with too high a loading of the converters.

Preferably, the gain value is calculated by means of an equivalent function. The system behavior can be mathematically modeled in this equivalent function. With advantage, a much simplified equivalent model of the electrical system of the wind turbine is used as a basis here. A quadratic equivalent function has proved successful.

Preferably, an opposing setpoint compared with the other inverter is provided so that there is no change with regard to the network.

In principle, the invention enables the equivalent function for calculating the gain value to be presented in a cohesive manner. It can have a plurality of elements in that a base function, which is preferably a quadratic function, is used in the calculation of the gain value and additional correction terms are formed. However, calling up the values from a look-up table (LUT) is preferred. A number of node points, which are specially matched to the particular wind turbines and their components, can be defined in the LUT. By appropriate selection of the node points, this enables load limits of the components to be taken into account, in particular of the inverter, and the current loading capability of the generator and transformer windings and the current loading capability of the cables. This prevents torques which would be greater than the rated torque being demanded. Furthermore, the inherent consumption of the wind turbine can be taken into account, which, depending on slip condition (positive or negative) additionally increases the load (slip positive, sub-synchronous operation) or relieves the load (slip negative, super-synchronous operation) on the corresponding transformer winding.

Individual deviations of this kind can be taken into account in a particularly elegant manner with the LUT. Regardless of whether an LUT or a base function with correction terms is used, the pairs of values are in each case determined with advantage so that the network-side inverter is practically fully used for providing reactive power in a rotational speed range down to the bottom reference value of the synchronous range, the machine-side inverter is practically fully used in the range from the bottom to the top reference value of the synchronous range, and the contribution of the machine-side inverter is again more closely limited above the top reference value of the synchronous range.

With advantage, the modification of the setpoint for the reactive power by means of the gain value is carried out by modulation. In practice, this can be carried out particularly easily by multiplication.

According to an advantageous embodiment of the invention, the reactive power calculation is carried out based on the current on the basis of a fixed voltage which preferably corresponds to the voltage value for the lower limit of a voltage tolerance band (usually 90% of the rated voltage or −10% tolerance compared with the design voltage). This enables a simple calculation with active and reactive currents instead of the active and reactive powers respectively.

The gain function can have a plurality of elements. An additional element, which takes into account a variable voltage (e.g. the rotor voltage), and not a fixed voltage, and/or further parameters (for example the temperature of the inverters), can be provided. A plurality of elements within the meaning of this invention also includes the use of a plurality of variables, e.g. for a series of characteristics.

The invention further relates to a converter and to a wind turbine having a controller which is appropriately designed to carry out the above method. Reference is made to the above description for a more detailed explanation of the principle of operation.

BRIEF DESCRIPTION OF THE DRAWINGS

The invention is described in more detail below with reference to the drawing based on an advantageous exemplary embodiment. In the drawing:

FIG. 1: shows a schematic overall view of a wind turbine;

FIG. 2a, b: show power flow diagrams in original and simplified representations;

DETAILED DESCRIPTION OF THE INVENTION

Figure 3:
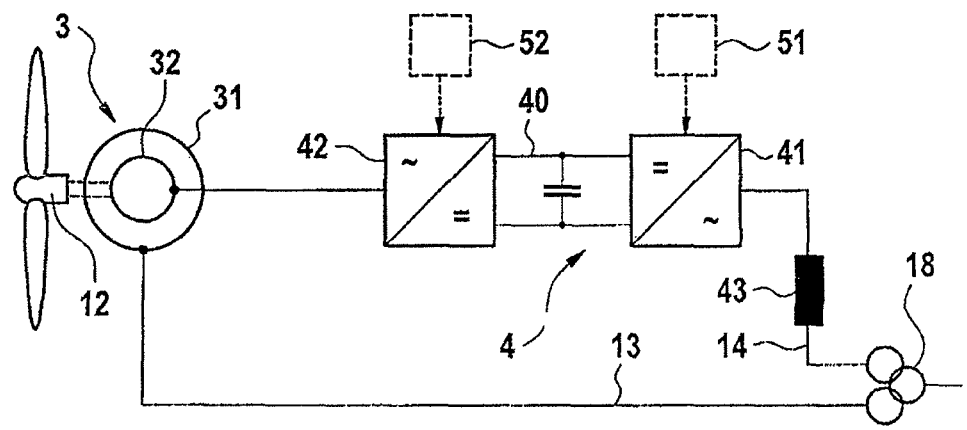
FIG. 3: shows a schematic view of the generator/converter system of the wind turbine according to FIG. 1.

The general structure of the wind turbine according to an exemplary embodiment of the invention is explained briefly with reference to FIG. 1. A wind rotor 12 of a wind turbine is set into rotation by the wind. The wind rotor 12 is connected to a generator 3 via a gearbox 30 and sets a rotor 32 of the generator 3 into rotation. A stator 31 of the generator 3 is connected by means of cables 13 in the tower 10 of the wind turbine and a transformer 18 to an electrical network 9. The rotor 32 of the generator 3 is connected to a converter 4, which in turn is likewise connected by means of cables 14 in the tower 10 to a second primary winding of the transformer 18 and by this means to the electrical network 9. A controller 5 for the converter 4, which in turn is connected to an operational controller 2, is also provided.

In the exemplary embodiment shown, the transformer 18 is designed with three windings, that is to say with separate windings for each of the cables 13 and 14 from the stator 31 and rotor 32 respectively. Designs with only two or some other, higher number of windings are likewise possible.

The interaction of the generator 3 and the converter 4 is shown in more detail in FIG. 3. The converter 4 comprises a generator-side inverter 42 and a network-side inverter 41 which are connected by means of a direct voltage link circuit 40 (alternatively a direct current link circuit can also be provided). The generator-side converter 42 is connected to the rotor 32. The network-side inverter 41 is connected via a choke 43 to a cable 14 to the transformer 18. The controller 5, which by means of inverter regulators 51, 52 (shown dotted in FIG. 3) controls the respective inverters 41, 42 associated therewith, is provided to control the converter 4.

The resulting power flows for active and reactive power are explained with reference to FIG. 2. The power-related topology of the wind turbine is shown in full in FIG. 2a. With its stator 31, the generator 3 produces a reactive power Q1 and an active power P1 with a voltage U1 and outputs these to the transformer 18. The rotor 32 is supplied with an active power P2 and a reactive power Q2 from the machine-side inverter 42 at a voltage U2. Furthermore, a current limit of magnitude I2max must be taken into account for the machine-side inverter 42. The network-side inverter 41 feeds the power P3 and the reactive power Q3 at a voltage U3 into the transformer 18. In doing so, the current limit I3max must be taken into account. The transformer 18 transmits the active power $P_T$ and $Q_T$ to the network 9 at a voltage $U_N$.

FIG. 2b shows a simplified diagram which is used as a basis for the consideration according to the invention. Here, the system formed by the generator 3 and converter 4 is converted to the voltage level $U_N$ of the network 9; the transformer 18 is therefore no longer considered. Further, for simplification, it is assumed that the lowest permissible voltage in the tolerance band always prevails, for example $U_N=0.9\times U$soll. As a result of this fixed voltage, the active and reactive power can be converted into corresponding active and reactive currents which are identified by the respective indices W and B.

Figure 4:
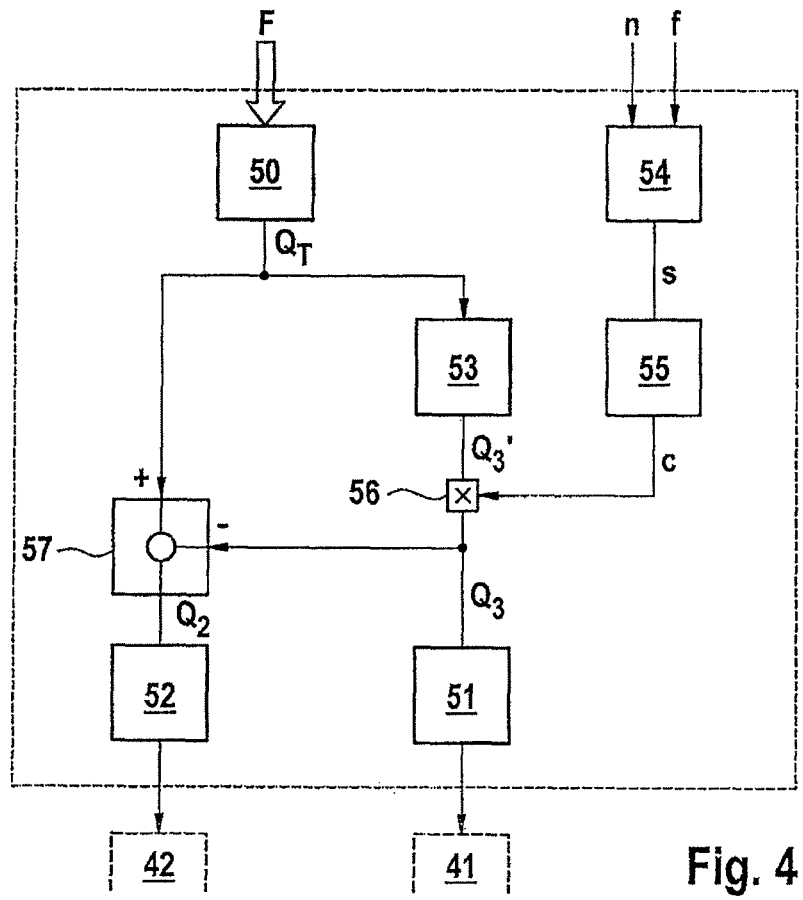
FIG. 4: shows an exemplary embodiment of a controller designed according to the invention for a converter.
Figure 6:
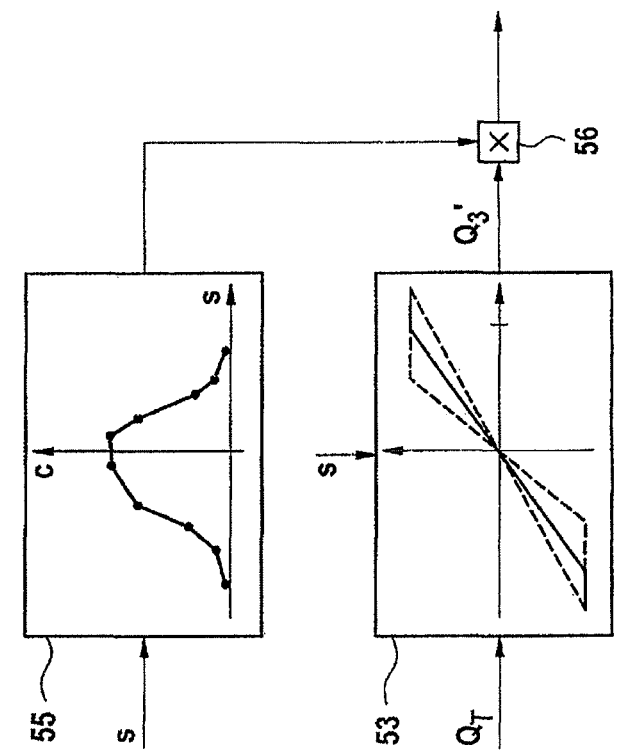
FIG. 6: shows a block diagram with a gain function.

The controller 5 is shown as a block diagram in FIG. 4. It comprises a control core 50, to which a control vector F with setpoint signals from the operational controller 2 is applied. From the control vector F, the control core 50 determines a signal for a setpoint for the total reactive power to be provided. This signal $Q_T$ is applied to an input of a characteristic element 53 by the control core 50. The characteristic element 53 contains a characteristic corresponding to a linear limit function which, in a manner which is known per se, determines the reactive power portion $Q_3'$ to be supplied by the network-side inverter 41 as a function of the demanded total reactive power $Q_T$ and makes it available at its output. This signal is fed to the inverter regulator 51 for the network-side inverter 41, but, according to the invention, is not applied directly. Rather, it forms the raw signal which is processed further by a block for the calculation according to the invention of the gain value as a function of a slip signal. A slip value s is applied to the gain block 55 as an input signal. This is determined by an upstream slip calculation block 54, to which values for the network frequency f and for the rotational speed n of the generator 3 are applied as input signals. It must be noted that the slip calculation block 54 does not necessarily need to be part of the controller 5, but can equally well be arranged externally, for example as part of the operational controller 2; in this case, the slip signal s would be applied to the controller 5 and therefore to the gain block 55 as part of the reference vector. The gain block 55 contains a function element which maps a characteristic determined by node points. An example of this is shown in FIG. 6. The gain block 55 determines a gain value c as a function of the signal for the slip as input value. This is modulated onto the output signal of the block 53 by means of a multiplication element 56, and the modified signal thus obtained is applied to its inverter regulator 51 as setpoint $Q_3'$ for the reactive power Q3 to be provided by the network-side inverter 41. The remaining residual portion of reactive power to be supplied is determined by means of a tracking unit 57, which in the exemplary embodiment shown is designed in the form of a differential element, and applied to the inverter regulator 52 of the machine-side inverter 42 as setpoint signal Q2. The controller can also be designed as a compact unit and be integrated in one of the inverter controllers 51, 52, for example in the inverter regulator 52. This enables the signal path to be simplified in that the signal for the total reactive power $Q_T$ is only applied to the integrated machine-side inverter 52 for example.

The action of the gain function is now explained with reference to FIG. 6. The setpoint for the total reactive power $Q_T$ is applied to an input of the characteristic block 53. Based on the limiter function shown, this determines that portion which is to be provided by the network-side inverter 41. With the notation of FIG. 2, this is therefore a raw determination of Q3soll or I3Bsoll. However, this value is not applied directly to the inverter 51 but is multiplied by a gain value from the gain function block 55 for further processing. It must be noted that further variables can be considered, for example a characteristic can be selected from a series of characteristics (shown dotted in FIG. 6) depending on the slip s.

The gain block 55 contains a characteristic which is determined by node points, wherein the regions between the node points are linearized by means of splines. In the ideal case, the characteristic is similar to a negative quadratic function with a maximum on the Y-axis. Such an equivalent function is shown in FIG. 5a. Correction terms, as shown in FIG. 5b, are formed for adapting to the current loading capability of other components, for taking into account other impedances, and, in particular, for taking into account the inherent consumption of the wind turbine. This results in the asymmetrical gain function shown in FIG. 5c, wherein the idealized equivalent function is shown for comparison. The gain value, which is modulated onto the setpoint for the network-side inverter 51 by means of the block 56, is calculated as a function of the slip determined by the block 54. At low slip, for example at slip 0, the gain value c reaches the greatest value (increase) and the network-side inverter provides a major portion of the required reactive power. On the other hand, a smaller gain value (reduction), which is used by the network-side inverter to produce reactive power to only a correspondingly smaller extent, is determined at large slip or at a slip of −0.2 (rated slip).

Figure 7:
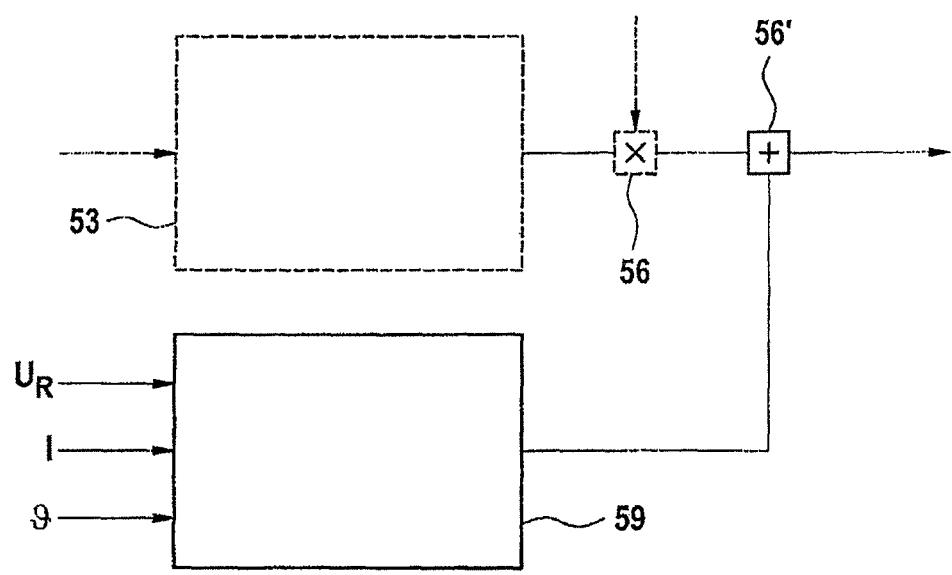
FIG. 7: shows an additional element for the gain function according to FIG. 6.

An additional element 59 for the gain function is shown in FIG. 7. In the exemplary embodiment shown, it comprises inputs for the voltage (e.g. rotor voltage), supplied current and temperature of the inverters 41, 42. As with the gain block 55, its output signal is modulated, namely either with the same block 56 or a further block 56' in which a different modulation function may be implemented. This enables a further change of the gain value to be achieved, for example a shift to higher or lower slip values.

Figure 8:
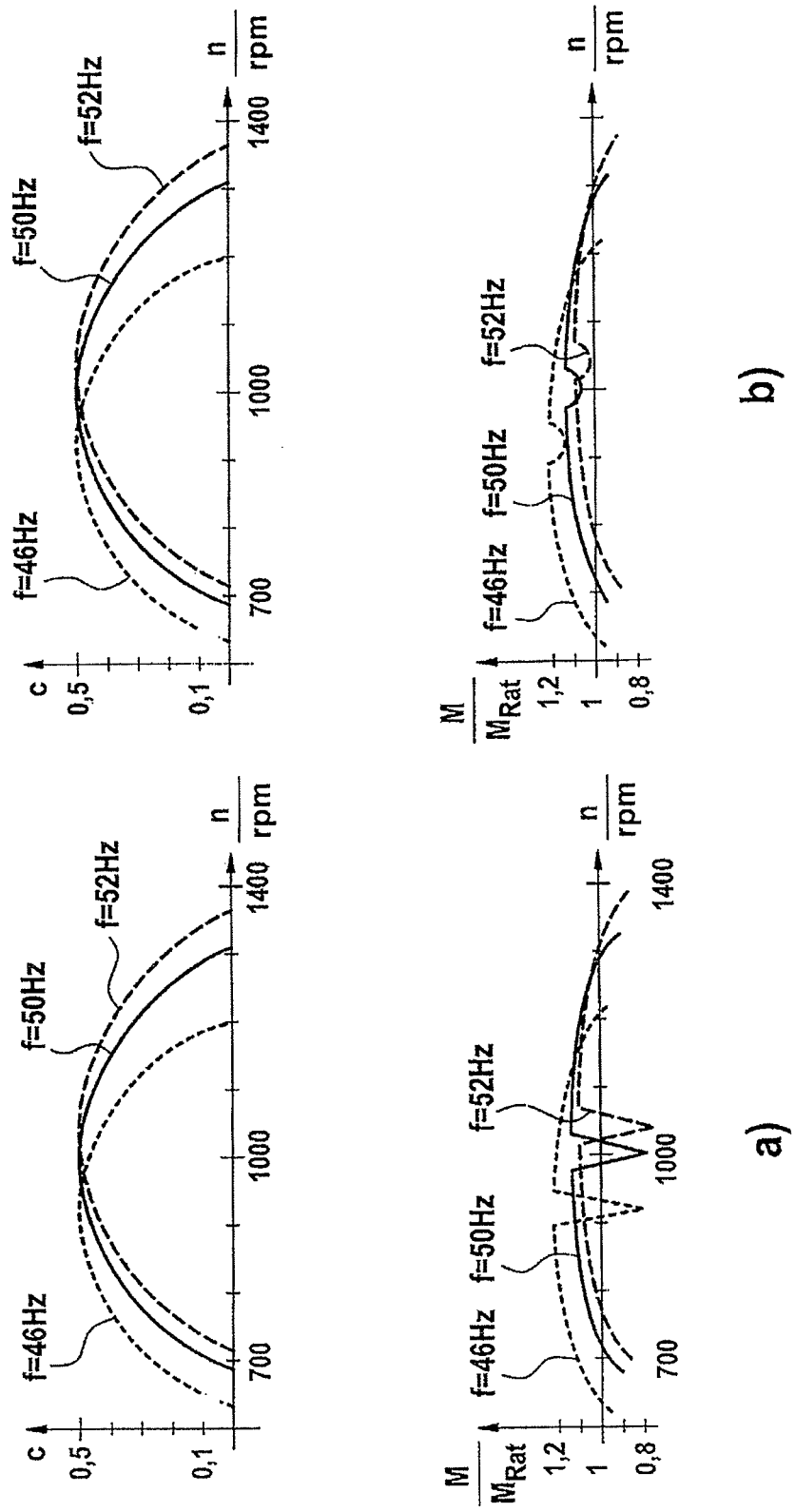
FIG. 8a, b: show diagrams for reactive power and torque for different operating conditions.

Two application examples are shown in FIG. 8. The resulting gain values over the different rotational speeds depending on the network frequency are shown for a quadratic gain function in FIG. 8b top. Values up to 0.5 are achieved, which means that the network-side inverter provides up to half of the reactive power to be provided. The torque possible with this distribution between the network-side and machine-side inverters 41, 42 which can still be absorbed without overload is shown in FIG. 8b bottom. It can be seen that a torque which is greater than the rated torque can be transmitted at reduced (46 Hz), normal (50 Hz) and also at increased (52 Hz) network frequency owing to the distribution of the reactive currents between the inverters according to the invention. The same is shown in FIG. 8a, however with an additional restriction. In real operation, when operating at or near the synchronous operating point, the machine-side inverter 42 has only a small current loading capability, as otherwise the active elements of the inverter 42 would overheat on account of the low fundamental frequencies. The torque must therefore be reduced in this region. This can be seen from the notch-like torque reductions in FIG. 8a, which in each case lie at the synchronous rotational speed determined by the network frequency (N=920 rpm for f=46 Hz, 100 rpm at f=50 Hz and 1040 rpm at f=52 Hz). In spite of this restriction with regard to the operation of the machine-side inverter, by virtue of the invention, the transmittable torque can be maintained above the rated torque in the vicinity of the synchronous operating point even under unfavorable operating conditions.

Figure 9:
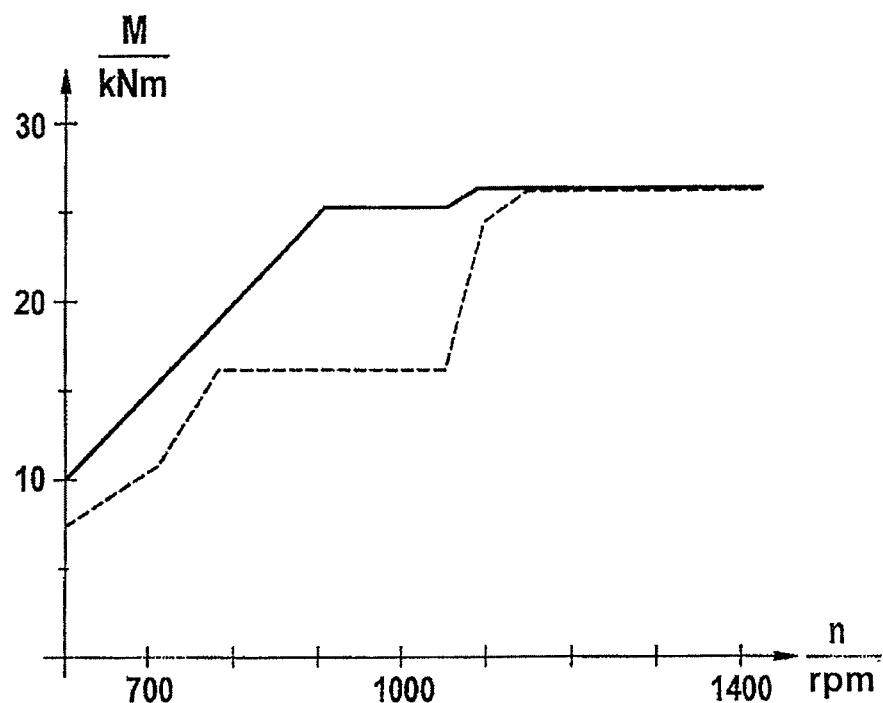
FIG. 9: shows a characteristic diagram with an idealized and a node-point-based gain function.

By virtue of the improved reactive power distribution resulting from the gain function, the invention therefore enables the maximum permissible torque in the synchronous region to be significantly increased. This is illustrated in FIG. 9. The dotted lines show the maximum torque at different rotational speeds for a wind turbine according to the prior art, and the continuous line for a wind turbine according to the invention.

In addition, the invention enables the negative loading effects, which conventionally occur when the network frequency changes, to be contained by the slip control of the gain function in that the system responds accordingly to increasing active currents in a power path (rotor or stator) with a reduction in the reactive currents, and the reduced portion is transferred accordingly to the other power path. This is accompanied by an extension of the torque range at extreme rotational speeds. Finally, by incorporating correction terms in the gain function or by incorporating specific setting of node points, the invention enables a fine adjustment to be carried out, wherein all components in the power path can be taken into account and overloads can therefore be avoided. Furthermore, it is possible to save a plurality of characteristics and therefore to generate different torque limit curves.

Figure 5:
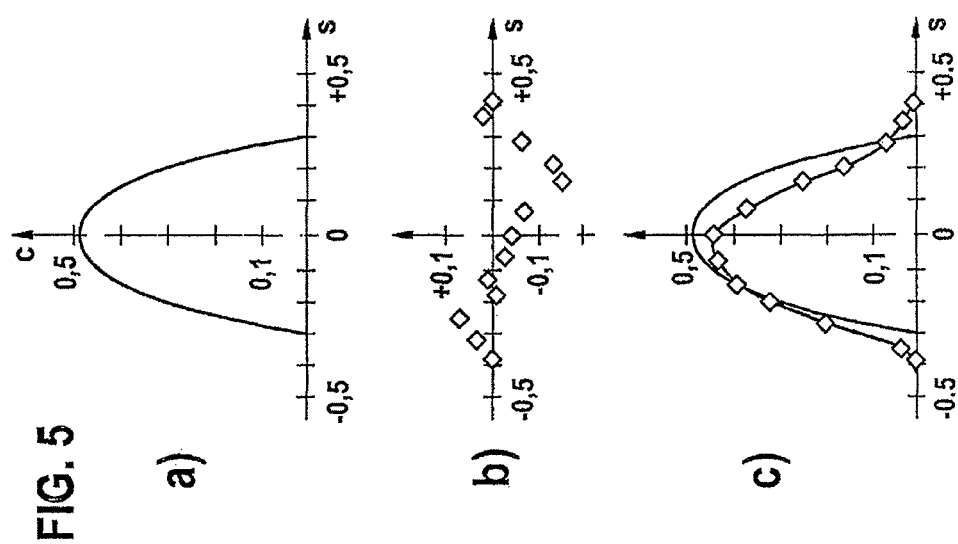
FIG. 5a-c: show diagrams of an idealized and corrected function for the gain values.
Figure 10:
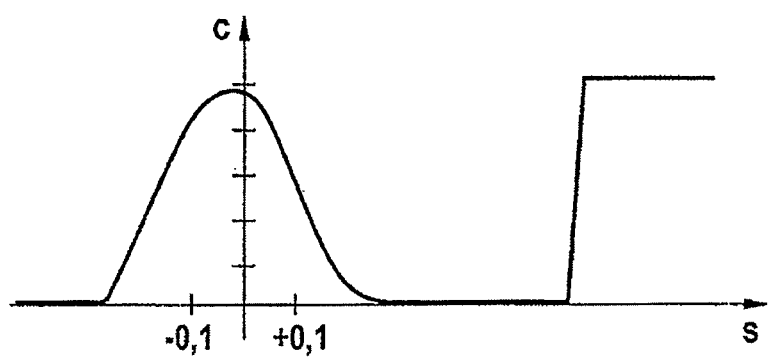
FIG. 10: shows a characteristic diagram for a variant.

Furthermore, in a variant, the gain function shown in FIG. 5 can be modified. An example of such a variant is shown in FIG. 10. In the central region, the gain function is shown substantially similar to that in FIG. 5c. In the higher slip region s, however, it rises steeply and then remains at a high gain value c. Better protection against overload can be achieved with this gain function characteristic. A steep rise in the rotor voltage can occur at high slip values s, which is countered by an increased output of reactive power of the machine-side inverter 42. To prevent this from being overloaded at high slip values, the variant provides that, as a result of the high gain value c, not only is the reactive power output transferred to the network-side inverter but also the rotor voltage is reduced by the high reactive power output.

The invention claimed is:

1. A method for controlling a converter of a wind turbine, the converter connected to a rotor of a doubly fed asynchronous generator in order to feed electrical energy into an electrical network and comprising a network-side inverter, a generator-side inverter and a controller configured to output setpoints for demanded reactive power to at least one of the inverters comprising:
   determining a reactive power setpoint signal for a portion that one of the inverters contributes to the demanded reactive power,
   determining a slip signal from a frequency of the network and a rotational speed of the generator,
   calculating a gain value as a function of the slip signal, and
   modifying the reactive power setpoint signal for the one of the inverters using the gain value.

2. The method of claim 1, comprising using an opposite of the reactive power setpoint signal for the other of the inverters.

3. The method of claim 1, comprising calculating of the gain value using an equivalent function.

4. The method of claim 3, comprising using a quadratic function as the equivalent function.

5. The method of claim 3, comprising calling up the gain value from a look-up table.

6. The method of claim 4, comprising taking additional correction terms into account.

7. The method of claim 1,
   comprising
   calculating the gain value based on node points.

8. The method of claim 7, comprising linearizing using spline functions between the node points.

9. The method of claim 1, comprising determining the gain value such that the network-side inverter is fully used in a rotational speed range down to the lower synchronous range, the machine-side inverter is fully used from the bottom to the top end of the synchronous range, and the machine-side inverter is partially used above the upper synchronous range.

10. The method of claim 9, comprising increasing the gain value, at high values of the slip signal.

11. The method of claim 1, comprising carrying out the modification by multiplication.

12. The method of claim 1, comprising carrying out the reactive power calculation based on the current on the basis of a fixed voltage.

13. A wind turbine comprising:
   a wind rotor,
   a doubly fed asynchronous generator driven by the wind rotor, and
   a converter comprising a network-side inverter, a generator-side inverter and at least one converter controller configured to feed electrical energy into a network,
   wherein the controller is configured to apply setpoints for demanded reactive power to at least one of the inverters and comprises
      a calculation unit configured to determine the contribution of one of the inverters to the demanded reactive power,
      a gain block configured to calculate a gain value as a function of an applied slip signal, and
      a modulator configured to modify the gain value determined by the gain block onto a reactive power setpoint signal determined by the calculation unit for the one of the inverters.

14. The wind turbine of claim 13, wherein the converter with its controller is configured to carry out the method of claim 2.

15. The method of claim 9, comprising increasing the gain value at high values of the slip signal above the top end of the slip region.

16. The method of claim 9, comprising increasing the gain value at high values of the slip signal up to the maximum.

17. The method of claim 1, comprising carrying out the reactive power calculation based on the current on the basis of a fixed voltage comprising the lower tolerance voltage.

* * * * *

UNITED STATES PATENT AND TRADEMARK OFFICE
CERTIFICATE OF CORRECTION

| | | |
|---|---|---|
| PATENT NO. | : 8,934,270 B2 | Page 1 of 1 |
| APPLICATION NO. | : 13/824255 | |
| DATED | : January 13, 2015 | |
| INVENTOR(S) | : Heinz-Hermann Letas | |

It is certified that error appears in the above-identified patent and that said Letters Patent is hereby corrected as shown below:

In the Specification:

At column 6, line 52, please delete "inverter" and insert --inverter 41--.

In the Claims:

At column 7, claim 1, line 7, please delete "inverters" and insert --inverters,--.

Signed and Sealed this
Ninth Day of June, 2015

Michelle K. Lee
*Director of the United States Patent and Trademark Office*